United States Patent
Shoji

(10) Patent No.: US 6,404,759 B1
(45) Date of Patent: Jun. 11, 2002

(54) CDMA MULTI-USER RECEIVING APPARATUS INCLUDING INTERFERENCE CANCELLER WITH OPTIMAL RECEIVING STATE

(75) Inventor: Takashi Shoji, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/298,912

(22) Filed: Apr. 26, 1999

(30) Foreign Application Priority Data

May 1, 1998 (JP) .......................................... 10-122491

(51) Int. Cl.$^7$ ................................................ H04J 13/04
(52) U.S. Cl. ........................................ 370/342; 375/148
(58) Field of Search ................................. 370/341, 342, 370/335, 345, 310, 320; 375/140, 144, 148, 349; 455/295, 296, 304, 305

(56) References Cited

U.S. PATENT DOCUMENTS 6,282,233 B1 * 8/2001 Yoshida ...................... 375/148

FOREIGN PATENT DOCUMENTS

| JP | 7-273713 | 10/1995 |
| JP | 9-331274 | 12/1997 |
| JP | 2737775 | 1/1998 |
| JP | 10-51353 | 2/1998 |

* cited by examiner

Primary Examiner—Thanh Cong Le
(74) Attorney, Agent, or Firm—Sughrue Mion, PLLC

(57) ABSTRACT

A multi-user CDMA (Code Division Multiple Access) interference canceller includes a coefficient output section and a plurality of stages. The coefficient output section dynamically determines a weight coefficient based a reception state of each of a plurality of user signals of a reception signal. Each of the plurality of stages other than the last stage includes a first interference estimating section and a synthesizing unit. The first interference estimating section is provided for each of the plurality of user signals. Also, the first interference estimating section outputs a symbol replica for a next stage and a user reproduction signal for the corresponding user signal based on a symbol replica received from a previous stage, an input signal and a weight coefficient for the corresponding user signal. The synthesizing unit outputs a residual signal for the next stage based on the input signal and the user reproduction signals. The last stage includes a second interference estimating section provided for each of the plurality of user signals. The second interference estimating section outputs a final user reproduction signal based on the symbol replica from the previous stage for the corresponding user signal and the input signal.

19 Claims, 3 Drawing Sheets

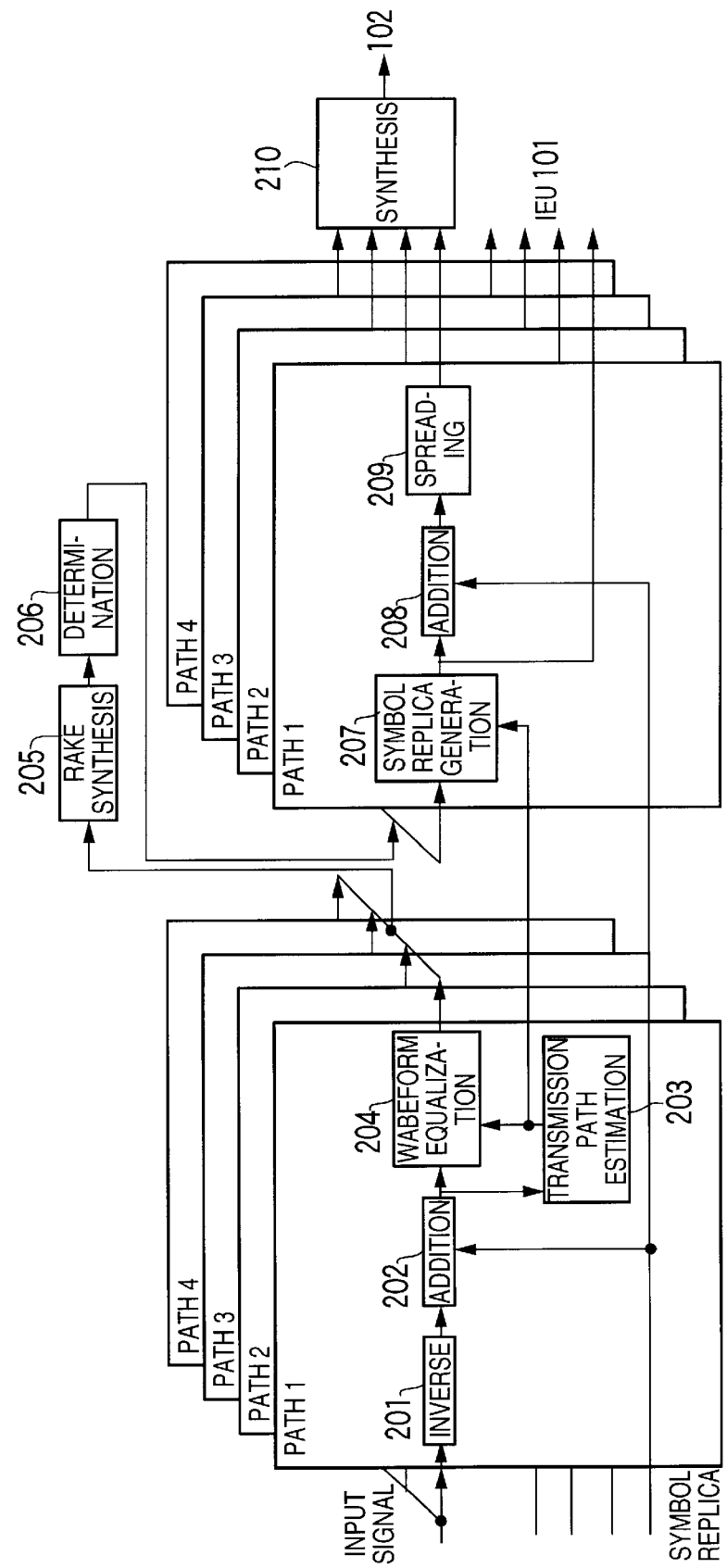

CDMA MULTI-USER RECEIVING APPARATUS INCLUDING INTERFERENCE CANCELLER WITH OPTIMAL RECEIVING STATE

BACKGROUND OF THE INVENTION

1. Field of the Invention

The present invention relates to a CDMA (Code Division Multiple Access) multi-user receiving apparatus including an interference canceller, and more particularly to a CDMA multi-user receiving apparatus including an interference canceller which an interference removing process is carried out at each of stages to output demodulation signals from all users.

2. Description of the Related Art

Conventionally, a CDMA receiving apparatus spreads is used for a communication system using a CDMA system, in which an information signal is spread and modulated with the signal ten times to hundred times faster than the information signal.

For such a CDMA receiver, a single user receiver is generally used to receive a signal from one user. However, it is requested in recent years to efficiently extract a desired user signal, while removing interference with signals from other users. In this case, the interference changes depending upon time.

To respond to this request, a multi-user type interference canceller is known as described in, for example, the technical report of the electronic, information, and communication engineers, RCS 96-100. In the reference, replicas (spread signals) of other user signals are reproduced from a reception signal by use of a determined symbol, a transmission path data and a spreading code, and the reproduced spread signals are subtracted from the reception signal. Then, a desired user signal is demodulated by use of the subtracted signal once again.

The technique described in the above reference is disclosed in Japanese Laid Open Patent Application (JP-A-Heisei 10-51353), and will be described with reference to a block diagram of the CDMA multi-user receiving apparatus shown in FIG. 1.

Referring to FIG. 1, the receiving apparatus is composed of three receiving apparatus stage 1 to 3. In each of the receiving apparatus stages 1 to 3, a demodulating process and an interference removal process are carried out regardless of the reception signal level. Each of the receiving apparatus stages 1 and 2 is composed of three interference estimating units (IEUs) 101-1 to 101-6, multipliers 102-1 to 102-6, delay units 106-1 and 106-2 and adders 107-1 and 107-2. Each of the interference estimating units 101-1 and 101-4, 101-2 and 101-5, and 101-3 and 101-6 corresponds to 3 user signals. Each of the delay units 106-1 and 106-2 corresponds to the multipliers 102-1 to 102-3, or 102-4 to 102-6. Each of the adders 107-1 and 107-2 corresponds the delay unit 106-1 or 106-2. The adders 107-1 and 107-2 input the outputs of the delay units 106-1 and 106-2 and output an adding result to three interference estimating units 101-4 to 101-6, and 101-7 to 101-9. The respective interference estimating units 101-1 to 101-3, 101-4 to 101-6, and 101-7 to 101-9 at each stage input a reception signal and interference removal residual signals obtained from the adders 107-1 and 107-2 at the previous stage, respectively. Also, the interference estimating units 101-4 to 101-6 and 101-7 to 101-9 input reception symbol replicas of the corresponding user signals which have been estimated in the interference estimating units 101-1 to 101-3 and 101-4 to 101-6 at the previous stage. The interference estimating units 101-1 to 101-3 and 101-4 to 101-6 re-estimate the reception symbol replicas of the current stage to output to the interference estimating units 101-4 to 101-6 and 101-7 to 101-9 for the same user signals at the next stage. Also, the interference estimating units 101-1 to 101-3, and 101-4 to 101-6 output spreading process results of the difference between the reception symbol replicas at the current stage and the reception signal or the interference removal residual signals (hereinafter, to be referred to as error signals).

In each of the interference estimating units 101-7 to 101-9 at the last stage 3, it is not necessary to re-estimate interference replicas at the current stage 3. Therefore, demodulation result are outputted just as they are, as demodulation signals A to C for the respective user signals.

The interference removal residual signal inputted to each of the interference estimating units 101-1 to 101-3 at the first stage 1 is the reception signal itself. At the last stage 3, the delay unit 106 and the adder 107 are omitted.

The delay unit 106 delays the interference removal residual signal which is also supplied to the interference estimating unit 101 by the time until a reproduction signal is outputted from the multiplier 102. The delayed signal is supplied to the adder 107. The error signal to be supplied to the adder 107 is obtained by multiplying a weighting factor α with the output of the interference estimating unit 101. The interference removal residual signal is obtained by subtracting three error signals of the interference estimating units 101 from the output of the delay unit 106 and is outputted to the next stage.

In this way, when there are many user signals which are to be processed in parallel so that the characteristic sometimes degrades, the reliability of the interference removal residual signal obtained through the interference removing process is sometimes decreased, if the multiplication of the interference removal suppression weighting coefficient α is carried out. Therefore, the weighting coefficient α below "1" is multiplied to prevent the decrease of the reliability of the interference removal residual signal and the degradation of the interference removal characteristic.

However, as seen from the above description, the interference removal suppression coefficient α is fixed. Therefore, there is a problem in that the interference removal suppression coefficient α is not always optimal to the number of user signals which can be transmitted at the same time, when the receiving states of the spread signal change randomly. Consequently, there is a problem in that the change of the operation point of the interference removal suppression coefficient α prevents the convergence operation of a multi-user type interference canceller so that the operation of the interference canceller diverges.

Also, there is another problem in that the interference removal suppression coefficient α is initially set to a small value so that the ability of the interference removing process can be suppressed to a low level, in order to operate the interference canceller in a stable state under any reception situation.

In conjunction with the above description, a receiving apparatus is described in Japanese Laid Open Patent Application (JP-A-Heisei 7-273713). In this reference, a sync signal is detected by a sync signal detecting section (10) and amplitude information (A1 to A3) and phase information (θ1 to θ3) of a main wave and a delay wave are generated from the reproduced sync signal. A sync signal removing section (9) removes the sync signal from a signal supplied from a radio demodulating section (8) by use of the reproduced sync signal. A reception signal r obtained thus is supplied to an other station interference removing sections (11). The other station interference removing sections (11 to 1K) estimate the first to N-th station signal while removing the interference between the stations from the reception signal by use of the amplitude information (A1 to A3) and the phase information (θ1 to θ3). A correlation detecting operation is performed to the estimated signals (r1K to rNK) by correlation detecting section (21 to 2N). Thus, the demodulation signals (S1 to SN) are obtained for the first to N-th stations.

Also, a DS-CDMA interference canceller is described in Japanese Laid Open Patent Application (JP-A-Heisei 9-331274). In this reference, a reception signal (S1) is supplied to a receivers (21 to 2n) and a reception level is measured for each user signal in units of blocks. A receiving level raking calculating section (18c) calculates the ranking of the reception level from the measuring result. The reception signal (S1) is supplied to a receiving signal blocking section (18a) which groups the reception signal into blocks. A ranking information adding section (18b) performs the ranking of the receiving levels inputted from the receiving level ranking calculating section (128c). ICUs (13-1 to 14-n) refers the receiving level ranking information of the reception signal blocks to perform an interference canceling operation to the reception signal for the corresponding user. Thus, demodulation signals are outputted from decoder (16-1 to 16-n).

Also, a DS-CDMA multi-user serial interference canceller is described in Japanese Patent No. 2737775. In this reference, the DS-CDMA multi-user serial interference canceller is composed of first to N-th (N is a natural number equal to or more than 2) stages, each of which includes k interference canceling units (k is a natural number equal to or more than 1). Each of users at each of the stages is transferred with a summation of interference replica signals of the other users which are produced in previous to a current stage. An interference replica signal of the user which is produced in the previous stage is subtracted from the summation of interference replica signals of the other users to produce a residual interference replica signal. The residual interference replica signal is subtracted from a reception signal and the subtracting result is supplied to the interference canceling unit of the user.

SUMMARY OF THE INVENTION

An object of the present invention is to provide a multi-stage type interference canceller and a receiving apparatus including it, in which an interference removal suppression coefficient is dynamically controlled in correspondence to the change of a reception situation so that stable and high interference removal ability can be accomplished.

Another object of the present invention is to provide a multi-user type interference canceller using an interference removal suppression coefficient in which an interference removal suppression coefficient is dynamically controlled based on a reception signal level such that it becomes possible to perform an optimal reception.

In order to achieve an aspect of the present invention, a multi-user CDMA (Code Division Multiple Access) interference canceller includes a coefficient output section and a plurality of stages. The coefficient output section dynamically determines a weight coefficient based a reception state of each of a plurality of user signals of a reception signal. Each of the plurality of stages other than a last stage includes a first interference estimating section and a synthesizing unit. The first interference estimating section for each of the plurality of user signals receives the weight coefficient for a corresponding user signal from the coefficient output section. Also, the first interference estimating section receives as a stage input signal, the reception signal when the stage is a first stage and a residual signal outputted from a previous stage when the stage is not the first stage. Also, the first interference estimating section receives a symbol replica outputted from the previous stage when the stage is not the first stage. Then, the first interference estimating section outputs the symbol replica for a next stage and a user reproduction signal for the corresponding user signal based on the symbol replica received from the previous stage, the stage input signal and the weight coefficient for the corresponding user signal. The synthesizing unit receives the stage input signal and the user reproduction signals from the first interference estimating sections for the plurality of user signals, and outputs the residual signal for the next stage based on the stage input signal and the user reproduction signals. The last stage includes a second interference estimating section provided for each of the plurality of user signals. The second interference estimating section receives the residual signal outputted from the previous stage as the stage input signal, and receives the symbol replica from the previous stage. The second interference estimating section outputs a final user reproduction signal based on the symbol replica from the previous for the corresponding user signal and the stage input signal.

The coefficient output section may include a measuring unit provided for each of the plurality of user signals, for measuring an electric power of the corresponding user signal in the reception signal to outputs a user reception state signal associated with the corresponding user signal electric power, and a coefficient control unit provided for each of the plurality of user signals, for dynamically determining the weight coefficient based on the user reception stage signal. In this case, the measuring unit may measure the corresponding user signal electric power and an electric power of an interference signal for the corresponding user signal in the reception signal, and may determine a SIR ratio indicating a ratio of the corresponding user signal electric power to the interference signal electric power to output as the user state signal to the corresponding coefficient control unit. Alternatively, the measuring unit may measure the corresponding user signal electric power in the reception signal, and may determine the user state signal based on the corresponding user signal electric power to output the corresponding coefficient control unit.

In this case, the coefficient control unit dynamically determines a value of the weight coefficient as one of a plurality of values corresponding to the user state signal. The plurality of values are smaller than 1. Also, the coefficient control unit dynamically determines the weight coefficient value such that the weight coefficient value has a larger value when the user state signal indicates a larger value, and the weight coefficient value has a smaller value when the user state signal indicates a smaller value.

The first interference estimating section may include an interference estimating unit for receiving as the stage input signal and the symbol replica outputted from the previous stage when the stage is not the first stage, and for outputting the symbol replica for the next stage and a reproduction signal for the corresponding user signal based on the symbol replica received from the previous stage and the stage input signal, and a multiplier for multiplying the weight coefficient for the corresponding user signal from the coefficient output section and the reproduction signal from the interference estimating unit to output the user reproduction signal for the corresponding user signal.

The CDMA multi-user interference canceller may be contained in a receiving apparatus, a base station, or in a radio mobile station.

In order to achieve another aspect of the present invention, a method of receiving a plurality of user signals in an optimal state in a multi-user CDMA (Code Division Multiple Access) interference canceller, includes:

dynamically determining a weight coefficient based a reception state of each of the plurality of user signals of a reception signal; and obtaining final user reproduction signals from the reception signal based on the weight coefficient, wherein the obtaining step includes:

outputting a symbol replica for a next stage and a user reproduction signal for a corresponding user signal based on a symbol replica received from a previous stage when a current stage is not a first stage, a stage input signal and the weight coefficient for the corresponding user signal, the stage input signal being the reception signal when the stage is the first stage and a residual signal outputted from the previous stage when the stage is not the first stage; and outputting the final user reproduction signal based on the symbol replica from the previous for the corresponding user signal and the stage input signal.

BRIEF DESCRIPTION OF THE DRAWINGS

FIG. 3 is a block diagram of a symbol replica processing type interference estimating unit in the CDMA multi-user type receiving apparatus according to the first embodiment of the present invention.

DESCRIPTION OF THE PREFERRED EMBODIMENTS

A CDMA multi-user type receiving apparatus including an interference canceller of the present invention will be described below in detail with reference to the attached drawings.

Figure 1:
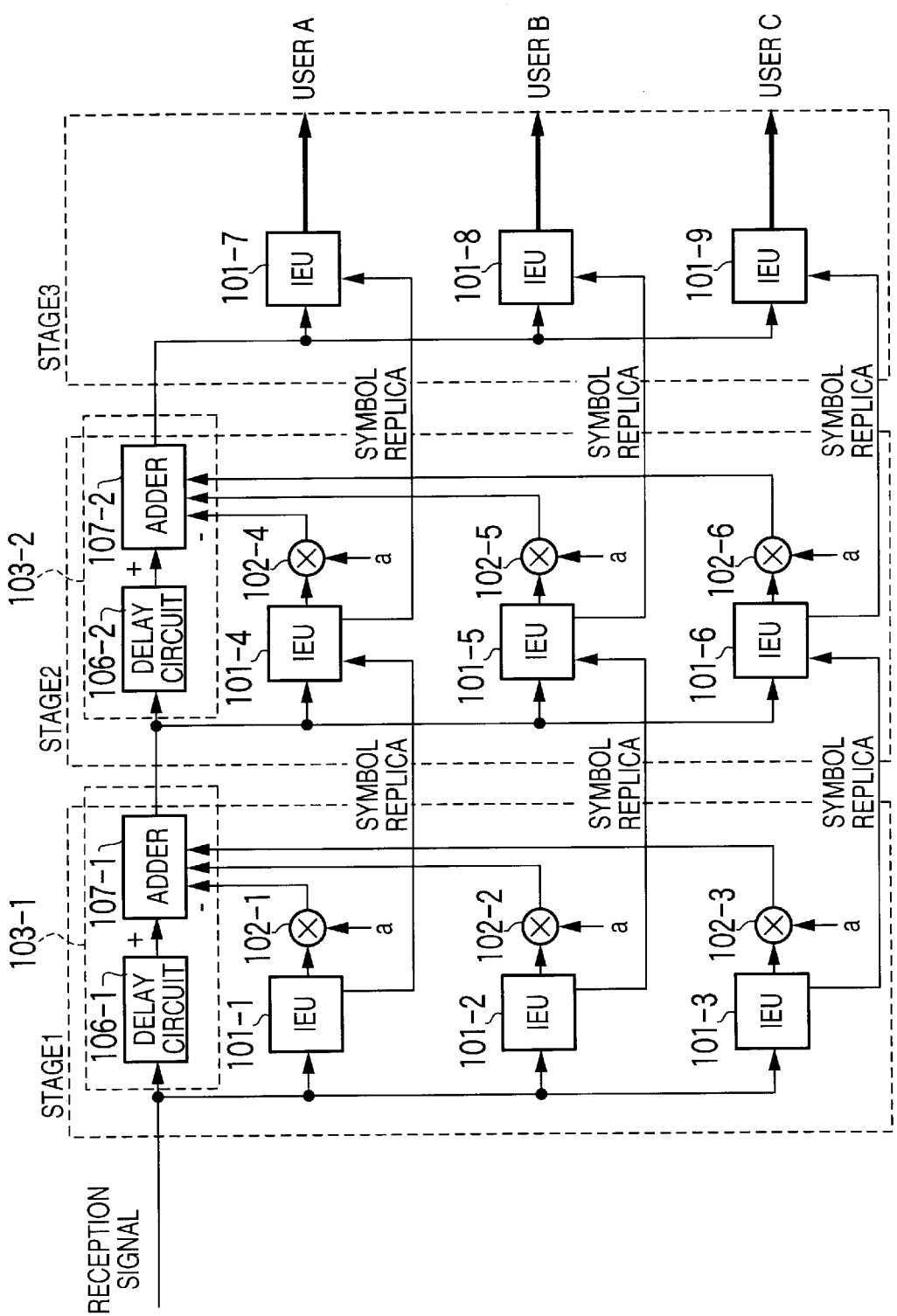
FIG. 1 is a block diagram of a conventional multi-user receiving apparatus.
Figure 2:
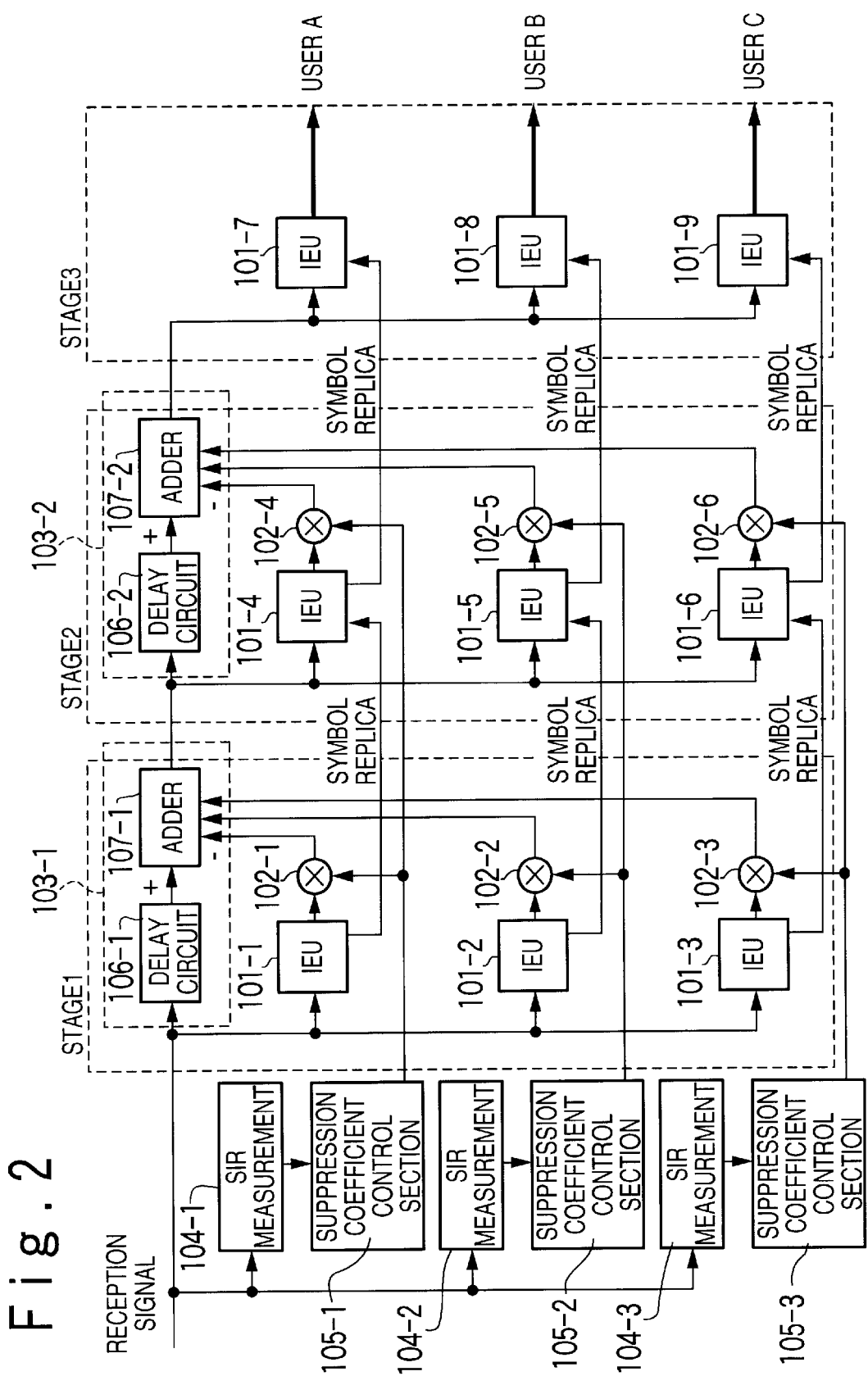
FIG. 2 is a block diagram of a CDMA multi-user type receiving apparatus including an interference canceller according to an embodiment of the present invention.

FIG. 2 is a block diagram of a CDMA multi-user type receiving apparatus including an interference canceller according to an embodiment of the present invention. Referring to FIG. 2, a parallel type multi-user type receiving apparatus including an interference canceller according to the embodiment of the present invention has the 3-user 3-stage structure. However, in a general case, a reception signal for N (2≦N) user signals is received and interference is removed at M (2≦M) stages.

The multi-user type interference canceller in the embodiment is composed of a coefficient determining section and three stages 1 to 3. The coefficient determining section is composed of SIR measuring units 104-1 to 104-3, and suppression coefficient control units 105-1 to 105-3 for three user signals. The stages 1 and 2 are composed of reception signal synthesizing section 103-1 and 103-2, symbol replica processing type interference estimating units (IEU) 101-1 to 101-6, and interference removal suppression coefficient multiplying units 102-1 to 102-6, respectively. The synthesizing sections 103-1 and 103-2 are composed of delay units 106-1 and 1-6-2 and adders 107-1 and 107-2, respectively. The stage 3 is composed of symbol replica processing type interference estimating units (IEU) 101-7 to 101-9. There is no synthesizing section.

User reproduction spread signals are supplied from the interference estimating units 101-1 to 101-3 and 101-4 to 101-6 to the interference removal suppression coefficient multiplying sections 102-1 to 102-3 and 102-4 to 102-6, respectively. The user reproduction spread signals are multiplied with the interference removal suppression coefficients α as outputs of the suppression coefficient control units 105-1 and 105-3 in the multiplier 102-1 to 102-3 and 102-4 to 102-6, to produce user reproduction weighted signals, respectively. The user reproduction weighted signals from the multiplier 102-1 to 102-3 and 102-4 to 102-6 are processed in the synthesizing sections 103-1 and 103-2. That is, in the adder 107, the user reproduction weighted signals are subjected to subtracting processes or synthesizing processes with the delayed signals which are obtained by delaying the reception signal and an interference removal residual signal by the delay units 106-1 and 106-2, respectively.

On the other hand, symbol replica signals are generated for the respective user signals by the interference estimating units 101-1 to 101-3 and 101-4 to 101-6. The symbol replica signals are supplied to the interference estimating units 101-4 to 101-6 and 101-7 to 101-9 of the next stage and stored therein.

The interference removal suppression coefficients are multiplied with the user reproduction spread signals from this interference estimating units 101-1 to 101-3 to 101-4 to 101-6. The suppression coefficient control units 105-1 to 105-3 are provided for the respective user signals, and perform dynamic control operations for determining the interference removal suppression coefficient values in accordance with the reception signal quality or reception situation. That is, the dynamic control operation is performed based on a ratio of desired wave electric power and interference wave electric power in the reception signal (hereinafter, to be referred to as a reception SIR). These electric powers are measured by the SIR measuring units 104-1 and 104-3 provided for the respective user signals.

The symbol replica signals for the respective user signals are reproduced at the initial state. Then, the user reproduction spread signals obtained thus by the interference estimating units 101-1 to 101-3 and 101-4 to 101-6 are supplied to the multipliers 102-1 to 102-6, in which the interference removal suppression coefficient values are multiplied, respectively. All the user reproduction weighted signals are supplied to the synthesizing section 103-1 and 103-2, respectively. All the user reproduction weighted signals for the stage 1 or 2 are subtracted from the reception signal or the residual signal outputted from the previous stage by the adder 107-1 or 107-2. The subtracting result is supplied to the next stage as the interference removal residual signal.

At the last stage, the inverse spreading operation and the separating operation to the residual signal supplied from the previous stage are carried out for each user signal once again to produce a final user reproduction signal for each user signal. That is, the final user reproduction signal for each user signal is produced from the residual signal from the previous stage and the symbol replica signal from the previous stage.

Referring to FIG. 3, the interference estimating unit 101 shown in FIG. 2 will be described. That is, an interference removal residual signal or the reception signal from the previous stage is separated into respective process paths. The separated signal is subjected to an inverse spreading operation based on a spreading code which is allocated to a corresponding user signal by a matched filter of an inverse spreading section 201. Next, if there is a symbol replica signal from the previous stage, the inverse spread signal and the symbol replica signal are synthesized by a replica synthesizing section of an adding section 202. Then, a transmission path distortion is estimated by a transmission path estimating section 203 and a transmission path distortion coefficient is determined as a complex number when the synthesized signal is an orthogonal signal. Next, the reciprocal of the transmission path distortion coefficient or a complex conjugate of the complex number in case of the orthogonal signal is multiplied with the synthesized signal by a waveform equalizing unit of a distortion correcting section 204. Thus, the correction of the transmission path distortion is performed.

In the CDMA transmission, a separating operation is performed with a delay time (hereinafter, to be referred to as a path timing) of each transmission path. For this reason, a synthesizing operation (hereinafter, to be referred to as a RAKE synthesis) is performed at the same timing. Therefore, the modules from the inverse spreading section 201 to the waveform equalizing unit 204 are provided for the processing paths. FIG. 3 shows a 4-path structure. Thus, the correcting process of distortion due to the transmission path, the adjusting process in the path timing, and the synthesizing process by the RAKE synthesizing section 205 are performed. Moreover, a synchronous detecting section of a determining unit 206 performs symbol determination to the output of the RAKE synthesizing section 205.

More particularly, in case of a QPSK modulation, in the IQ coordinates in which an Ich level and a Qch level of the orthogonal signal are shown in the X axis and the Y axis, when a reception symbol exists in the first, second, third or fourth image quadrant, the determination symbol is expressed with (X, Y) as $(1/\sqrt{2}, 1/\sqrt{2})$, $(-1/\sqrt{2}, 1/\sqrt{2})$, $(-1/\sqrt{2}, -1/\sqrt{2})$, or $(1/\sqrt{2}, -1/\sqrt{2})$. This determining result is supplied to each transmission path, and after a noise signal is removed, the distortion coefficient of the transmission path is multiplied once again by a symbol replica generating section 207. Thus, the symbol replica signal is obtained.

The symbol replica signal is outputted to the interference estimating unit 101 of the next stage. At the same time, a difference between the symbol replica signal reproduced at the current stage and the symbol replica signal from the previous stage is calculated by an error calculating section of an adder 208, if there is the symbol replica signal from the previous stage. Then, the difference is spread once again by use of the spreading code for each user signal by a spreading modulating section 209 and is generated as the user reproduction spread signal.

In this case, the modules from the symbol replica generating section 207 to the spreading modulating section 209 are provided for the number of paths to be synthesized. In this way, the symbol replica signal is transmitted to the interference estimating unit 101 of the next stage for each path. Also, signals on the paths are synthesized by a synthesizing section 210 and is outputted to the multiplier 102 as the user reproduction spread signal. The user reproduction spread signal is subjected to the process mentioned above.

Next, the operations of the interference canceller according to the embodiment will be described. Especially, the operation of suppression coefficient control unit 105 will be described.

That is, the SIR measuring unit 104 measures a SIR which indicates the reception quality of the desired user signal after the inverse spreading by use of a known pilot symbol. The whole electric power of the known signal after the inverse spreading and an electric power of a signal in which the known signal after the inverse spreading are added in an in-phase state, so that noise is averaged, are calculated. Thus, it is supposed that the electric power of the signal with the noise averaged is a desired wave reception electric power is S and the interference wave electric power as the remainder when this "S" is subtracted from the whole electric power is I. In this case, the ratio of S to I is SIR (Signal/Interference).

Therefore, the suppression coefficient control unit 105 sets reference signals m1 and m2 (m1>m2) to the measured SIR.

$SIR \geq m1$, an interference removal suppression coefficient=$\alpha 1$.

$m2 \leq SIR < m1$, an interference removal suppression coefficient=$\alpha 2$.

$SIR < m2$, an interference removal suppression coefficient=$\alpha 3$.

where $(1.0 > \alpha 1 > \alpha 2 > \alpha 3 > 0.0)$.

As above mentioned, the interference suppression coefficient $\alpha$ is set to a large value when the SIR (ratio of desired wave electric power to interference wave electric power in the reception signal) as the reception quality of the reception signal is high (large), and is set to a small value when the SIR is low (small).

The interference removal suppression coefficient $\alpha$ is multiplied with the user reproduction spread signal which is the output of the interference estimating unit 101 of FIG. 2, and the multiplied signals is synthesized to the delayed residual signal or reception signal by the reception signal synthesizing section 103. The interference removal suppression coefficient $\alpha$ is large when the SIR is high, and is small when the SIR is low.

In the above embodiment, 3-stage 3-user structure is described. However, even if it is in case of M-stage n-user, the embodiment described above with reference to FIG. 2 can be applied. Especially, when the number of users increases, it is extremely effective that the interference removal suppression coefficient $\alpha$ has one of a plurality of values and is set in accordance with the reception quality (reception SIR) so that interference removal effect is increased.

Also, in the above embodiment, a multi-user interference removal receiving apparatus is merely described. However, the multi-user interference removal receiving apparatus may be provided in the base station which receives spread signals from a plurality of portable mobile stations in the CDMA communications system. Especially, the multi-user interference removal receiving apparatus may be provided in a portable mobile station which receives spread signals from a plurality of base stations at the time of hand-over. In this case, the removal efficiency of interference due to the other signals is increased so that the reception signal with high reliability can be attained.

Also, in the above embodiment, the interference removal is carried out in parallel for all the user signals. However, the embodiment may be applied to an interference removing apparatus having the serial process and parallel process hybrid structure in which the parallel process is partially carried out and a serial process is carried out between the parallel process user signals. In the case, the similar effect as described above can be attained. This is basically contained in the present invention.

Also, in the above embodiment, a spreading code period may be a short code spreading modulation which is equal to a symbol period and the spreading code period may be a long code spreading modulation which is longer than the symbol period, of course. Also, the reception spread signal may be modulated by any modulation method, and is not limited to the modulation method such as QPSK and QAM.

In this way, in the interference canceller receiving apparatus, the interference removal suppression coeffiecient $\alpha$ is controlled based on the measured SIR. When the measured SIR is low, the interference removal suppression coefficient $\alpha$ is made small to restrain the divergence of the system, because the number of other users is large so that the interference quantity is large. On the contrary, when the measured SIR is high, the interference removal suppression coefficient $\alpha$ is made large to increase the interference removal effect, because the number of other users is small so that the interference quantity is little. Therefore, the interference canceller can be operated in accordance with moment change of the reception situation to attain the optimal reception state.

Therefore, in the present invention, the multi-user type interference canceller can be realized to indicate a stable interference removal effect regardless of the number of users who communicate at the same time.

Moreover, in the embodiment, the dynamic control of the interference removal suppression coefficient $\alpha$ is carried out in accordance with the SIR measured from the reception signal. Therefore, the embodiment can use the circuit for the transmission electric power control system which is made indispensable to a conventional CDMA communications system. The transmission electric power control circuit determines a transmission electric power control value at the next slot in accordance with the measured SIR. The multi-user type interference canceller circuit determines the interference removal suppression coefficient $\alpha$ in accordance with the measured SIR. Thus, the function can be added without increasing a circuit scale.

It should be noted that in the above embodiment, the dynamic control of interference removal suppression coefficient $\alpha$ is carried out in accordance with the SIR measured from the reception signal. However, if it supposed that the input signal from the same antenna has the same interference wave level, the dynamic control may be carried out in accordance with the reception signal electric power of the desired wave.

What is claimed is:

1. A multi-user CDMA (Code Division Multiple Access) interference canceller comprising:
    a coefficient output section for dynamically determining a weight coefficient based a reception state of each of a plurality of user signals of a reception signal; and
    a plurality of stages,
    wherein each of said plurality of stages other than a last stage comprises:
        a first interference estimating section provided for each of said plurality of user signals, for receiving said weight coefficient for a corresponding user signal from said coefficient output section, for receiving as a stage input signal, said reception signal when said stage is a first stage and a residual signal outputted from a previous stage when said stage is not said first stage, for receiving a symbol replica outputted from said previous stage when said stage is not said first stage, and for outputting said symbol replica for a next stage and a user reproduction signal for said corresponding user signal based on said symbol replica received from said previous stage, said stage input signal and said weight coefficient for said corresponding user signal; and
        a synthesizing unit for receiving said stage input signal and said user reproduction signals from said first interference estimating sections for said plurality of user signals, for outputting said residual signal for said next stage based on said stage input signal and said user reproduction signals, and
    wherein said last stage comprises:
        a second interference estimating section provided for each of said plurality of user signals, for receiving said residual signal outputted from said previous stage as said stage input signal, for receiving said symbol replica from said previous stage, and for outputting a final user reproduction signal based on said symbol replica from said previous for said corresponding user signal and said stage input signal.

2. A multi-user CDMA interference canceller according to claim 1, wherein said coefficient output section includes:
    a measuring unit provided for each of said plurality of user signals, for measuring an electric power of said corresponding user signal in said reception signal to outputs a user reception state signal associated with said corresponding user signal electric power;
    a coefficient control unit provided for each of said plurality of user signals, for dynamically determining said weight coefficient based on said user reception stage signal.

3. A multi-user CDMA interference canceller according to claim 2, wherein said measuring unit measures said corresponding user signal electric power and an electric power of an interference signal for said corresponding user signal in said reception signal, and determines a SIR ratio indicating a ratio of said corresponding user signal electric power to said interference signal electric power to output as said user state signal to said corresponding coefficient control unit.

4. A multi-user CDMA interference canceller according to claim 2, wherein said measuring unit measures said corresponding user signal electric power in said reception signal, and determines said user state signal based on said corresponding user signal electric power to output said corresponding coefficient control unit.

5. A multi-user CDMA interference canceller according to claim 2, wherein said coefficient control unit dynamically determines a value of said weight coefficient as one of a plurality of values corresponding to said user state signal.

6. A multi-user CDMA interference canceller according to claim 5, wherein said plurality of values are smaller than 1.

7. A multi-user CDMA interference canceller according to claim 5, wherein said coefficient control unit dynamically determines said weight coefficient value such that said weight coefficient value has a larger value when said user state signal indicates a larger value, and said weight coefficient value has a smaller value when said user state signal indicates a smaller value.

8. A multi-user CDMA interference canceller according to claim 1, wherein said first interference estimating section includes:
    an interference estimating unit for receiving as said stage input signal and said symbol replica outputted from said previous stage when said stage is not said first stage, and for outputting said symbol replica for said next stage and a reproduction signal for said corresponding user signal based on said symbol replica received from said previous stage and said stage input signal; and a multiplier for multiplying said weight coefficient for said corresponding user signal from said coefficient output section and said reproduction signal from said interference estimating unit to output said user reproduction signal for said corresponding user signal.

9. A multi-user CDMA interference canceller according to claim 1, wherein said multi-user CDMA interference canceller is contained in a base station.

10. A multi-user CDMA interference canceller according to claim 1, wherein said multi-user CDMA interference canceller is contained in a radio mobile station.

11. A method of receiving a plurality of user signals in an optimal state in a multi-user CDMA (Code Division Multiple Access) interference canceller, comprising:

dynamically determining a weight coefficient based a reception state of each of said plurality of user signals of a reception signal; and obtaining final user reproduction signals from said reception signal based on said weight coefficient, wherein said obtaining step includes:

outputting a symbol replica for a next stage and a user reproduction signal for a corresponding user signal based on a symbol replica received from a previous stage when a current stage is not a first stage, a stage input signal and said weight coefficient for said corresponding user signal, said stage input signal being said reception signal when said stage is said first stage and a residual signal outputted from said previous stage when said stage is not said first stage; and outputting said final user reproduction signal based on said symbol replica from said previous for said corresponding user signal and said stage input signal.

12. A method according to claim 11, wherein said step of dynamically determining a weight coefficient includes:

measuring an electric power of said corresponding user signal in said reception signal to outputs a user reception state signal associated with said corresponding user signal electric power; and dynamically determining said weight coefficient based on said user reception stage signal.

13. A method according to claim 12, wherein said measuring step includes:

measuring said corresponding user signal electric power and an electric power of an interference signal for said corresponding user signal in said reception signal; and determining a SIR ratio indicating a ratio of said corresponding user signal electric power to said interference signal electric power.

14. A method according to claim 12, wherein said measuring step includes:

measuring said corresponding user signal electric power in said reception signal; and determining said user state signal based on said corresponding user signal electric power.

15. A method according to claim 12, wherein said step of dynamically determining said weight coefficient includes:

dynamically determining a value of said weight coefficient as one of a plurality of values corresponding to said user state signal.

16. A method according to claim 15, wherein said plurality of values are smaller than 1.

17. A method according to claim 15, wherein said step of dynamically determining said weight coefficient includes:

dynamically determining said weight coefficient value such that said weight coefficient value has a larger value when said user state signal indicates a larger value, and said weight coefficient value has a smaller value when said user state signal indicates a smaller value.

18. A method according to claim 11, wherein said multi-user CDMA interference canceller is contained in a base station.

19. A method according to claim 11, wherein said multi-user CDMA interference canceller is contained in a radio mobile station.

* * * * *